United States Patent
Mikami

(10) Patent No.: US 10,720,784 B2
(45) Date of Patent: Jul. 21, 2020

(54) CHARGING STAND

(71) Applicant: NEC Platforms, Ltd., Kawasaki-shi, Kanagawa (JP)

(72) Inventor: Hayato Mikami, Kanagawa (JP)

(73) Assignee: NEC Platforms, Ltd., Kawasaki-shi, Kanagawa (JP)

( * ) Notice: Subject to any disclaimer, the term of this patent is extended or adjusted under 35 U.S.C. 154(b) by 198 days.

(21) Appl. No.: 16/068,000

(22) PCT Filed: Dec. 14, 2016

(86) PCT No.: PCT/JP2016/087191
§ 371 (c)(1),
(2) Date: Jul. 3, 2018

(87) PCT Pub. No.: WO2017/149898
PCT Pub. Date: Sep. 8, 2017

(65) Prior Publication Data
US 2019/0006861 A1 Jan. 3, 2019

(30) Foreign Application Priority Data
Mar. 3, 2016 (JP) .................... 2016-040738

(51) Int. Cl.
*H02J 7/00* (2006.01)
(52) U.S. Cl.
CPC .............. *H02J 7/0044* (2013.01); *H02J 7/00* (2013.01)
(58) Field of Classification Search
CPC ....................................................... H02J 7/00
See application file for complete search history.

(56) References Cited

U.S. PATENT DOCUMENTS

| 7,956,573 B1 * | 6/2011 | Rosen | H02J 7/0045 320/107 |
| 8,482,251 B2 * | 7/2013 | McGary | H02J 7/0027 320/107 |
| 2015/0333549 A1 | 11/2015 | Koshiishi et al. | |

FOREIGN PATENT DOCUMENTS

| JP | 57-154241 U1 | 9/1982 |
| JP | 2000-195562 A | 7/2000 |

(Continued)

OTHER PUBLICATIONS

International Search Report for PCT/JP2016/087191 dated Jan. 17, 2017 [PCT/ISA/210].

*Primary Examiner* — Robert Grant
(74) *Attorney, Agent, or Firm* — Sughrue Mion, PLLC

(57) ABSTRACT

A charging stand of this invention includes: a terminal placing section; a terminal mounting portion, which is provided in the terminal placing section, and to which contact pins serving as charging terminals are mounted; a left-side top surface portion provided on a left side of the terminal mounting portion; and a right-side top surface portion provided on a right side of the terminal mounting portion. The terminal mounting portion includes a mounting portion ridge line and two mounting portion inclined surfaces. The left-side top surface portion includes: a left-side top surface portion ridge line extending at a height lower than a height of the mounting portion ridge line; and two left-side top surface portion inclined surfaces. The right-side top surface portion includes: a right-side top surface portion ridge line extending at a height lower than the height of the mounting portion ridge line; and two right-side top surface portion inclined surfaces.

10 Claims, 13 Drawing Sheets

(56) References Cited

FOREIGN PATENT DOCUMENTS

| | | |
|---|---|---|
| JP | 2002-354688 A | 12/2002 |
| JP | 2003-087981 A | 3/2003 |
| JP | 2011-091924 A | 5/2011 |
| JP | 2012-055122 A | 3/2012 |
| JP | 2015-220887 A | 12/2015 |

* cited by examiner

CHARGING STAND

CROSS REFERENCE TO RELATED APPLICATIONS

This application is a National Stage of International Application No. PCT/JP2016/087191 filed Dec. 14, 2016, claiming priority based on Japanese Patent Application No. 2016-040738 filed Mar. 3, 2016.

TECHNICAL FIELD

This invention relates to a charging stand for a portable terminal device.

BACKGROUND ART

In a portable terminal device, a built-in battery (secondary battery) is required to be charged. The battery of the portable terminal device is charged by placing the portable terminal device on a charging stand (cradle) in some cases.

An example of a charging stand for a portable terminal device of this type is illustrated in FIG. 10 (*a*), FIG. 10 (*b*), and FIG. 13.

As illustrated in FIG. 10 (*a*) and FIG. 10 (*b*), a charging stand 600 for a portable terminal device in the related art has a stand width direction W being a longitudinal direction thereof, a stand depth direction D perpendicular to the width direction, and a stand height direction H perpendicular to the stand width direction W and the stand depth direction. The charging stand 600 includes two terminal placing recessed sections 610A and 610B in an upper part thereof. Further, the terminal placing recessed sections 610A and 610B include contact pins 621A and 621B serving as charging terminals, respectively. The charging stand 600 is connected to a commercial power supply via an alternating current (AC) cable and an AC plug, but illustrations of the AC cable and the AC plug are omitted in FIG. 10 (*a*) and FIG. 10 (*b*).

Meanwhile, as illustrated in FIG. 11 and FIG. 12 (*a*) to FIG. 12 (*c*), a portable terminal device 700, which is a charging target device of the charging stand 600, includes a display 703 including a touch panel on a front surface of the portable terminal device 700, to-be-charged terminals (not shown) on a bottom surface thereof, and a battery (not shown) in an inside thereof.

The charging stand 600 is capable of charging two portable terminal devices 700 under a state in which each of the two portable terminal devices 700 is placed on one of the two terminal placing recessed sections 610A and 610B as illustrated in FIG. 13. Further, it is possible to charge the portable terminal device 700 by connecting a charging cable 800 to the charging stand 600 and mounting an attachment of the charging cable to the portable terminal device 700. In this case, only one portable terminal device 700 can be charged on the charging stand.

Incidentally, a user may accidentally spill liquid, for example, water, on a charging stand for a portable terminal device of this type. However, this charging stand 600 does not include a liquid stagnation prevention structure for preventing stagnation of liquid. Therefore, when liquid, for example, water, is accidentally spilled on the terminal placing recessed sections, which are surrounded by wall portions, the liquid may stagnate in the terminal placing recessed sections to cause a short circuit of the charging terminals.

In view of this, in Patent Document 1, there is disclosed a charging device for a portable-type electronic device having a structure including drainage paths adjacent to bottom surfaces in the vicinity of charging terminals.

PRIOR ART DOCUMENTS

Patent Document

Patent Document 1: JP 2002-354688 A

SUMMARY OF THE INVENTION

Problem to be Solved by the Invention

However, in the technology disclosed in Patent Document 1, bottom surfaces (9a and 10a) of pockets (9 and 10) of a charger main body (8) have inclinations only in a depth direction of the charger main body (8). Therefore, when the technology disclosed in Patent Document 1 is applied to a charging stand that has a longitudinal direction as the charging stand 600, part of liquid spilled on terminal placing recessed sections may stagnate in the terminal placing recessed sections without flowing to the drainage paths. For that reason, there is desired a charging stand capable of preventing stagnation of accidentally spilled liquid even when the charging stand has a shape having a longitudinal direction.

It is an object of this application to provide a technology for solving the above-mentioned problem, and provide a charging stand capable of preventing stagnation of accidentally spilled liquid even when the charging stand has a shape having a longitudinal direction.

Means to Solve the Problems

According to one aspect of this invention, there is provided a charging stand, which has a stand width direction being a longitudinal direction of the charging stand and a stand depth direction perpendicular to the stand width direction, the charging stand comprising a terminal placing section, which is provided on an upper part of the charging stand so as to extend along the stand width direction, and onto which a portable terminal device is to be removably placed; a terminal mounting portion, which is provided in the terminal placing section, and to which charging terminals are mounted, the charging terminals being configured to come into abutment with to-be-charged terminals of the portable terminal device placed on the terminal placing section, to thereby charge the portable terminal device; a left-side top surface portion, which is provided on a left side of the terminal mounting portion in the stand width direction; and a right-side top surface portion, which is provided on a right side of the terminal mounting portion in the stand width direction, the terminal mounting portion including a mounting portion ridge line, which extends along the stand depth direction; and two mounting portion inclined surfaces, which extend while descending from the mounting portion ridge line to each of the left-side top surface portion and the right-side top surface portion, the left-side top surface portion including a left-side top surface portion ridge line, which extends along the stand width direction and at a height lower than a height of the mounting portion ridge line; and two left-side top surface portion inclined surfaces, which extend while descending from the left-side top surface portion ridge line to each of a front end and a rear end of the charging stand in the stand depth direction, the right-side top surface portion including a right-side top surface portion ridge line, which extends along the stand width direction and at a height lower than the height of the mounting portion ridge line; and two right-side top surface portion inclined surfaces, which extend while descending from the right-side top surface portion ridge line to each of the front end and the rear end of the charging stand in the stand depth direction.

Effect of the Invention

The charging stand according to this invention is capable of preventing stagnation of accidentally spilled liquid even when the charging stand has the shape having the longitudinal direction.

MODE FOR EMBODYING THE INVENTION

Figure 1:
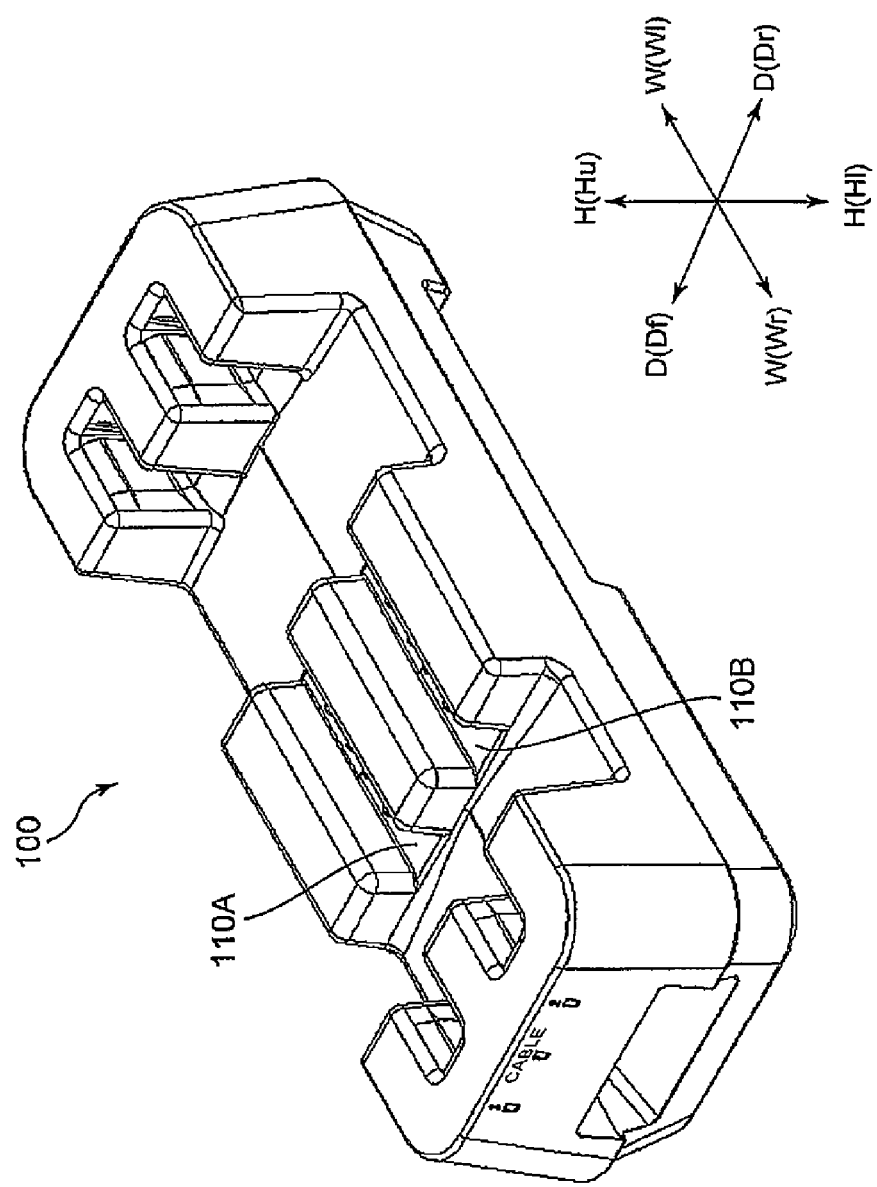
FIG. 1 is a perspective view of a charging stand according to an embodiment of this invention.
Figure 2:
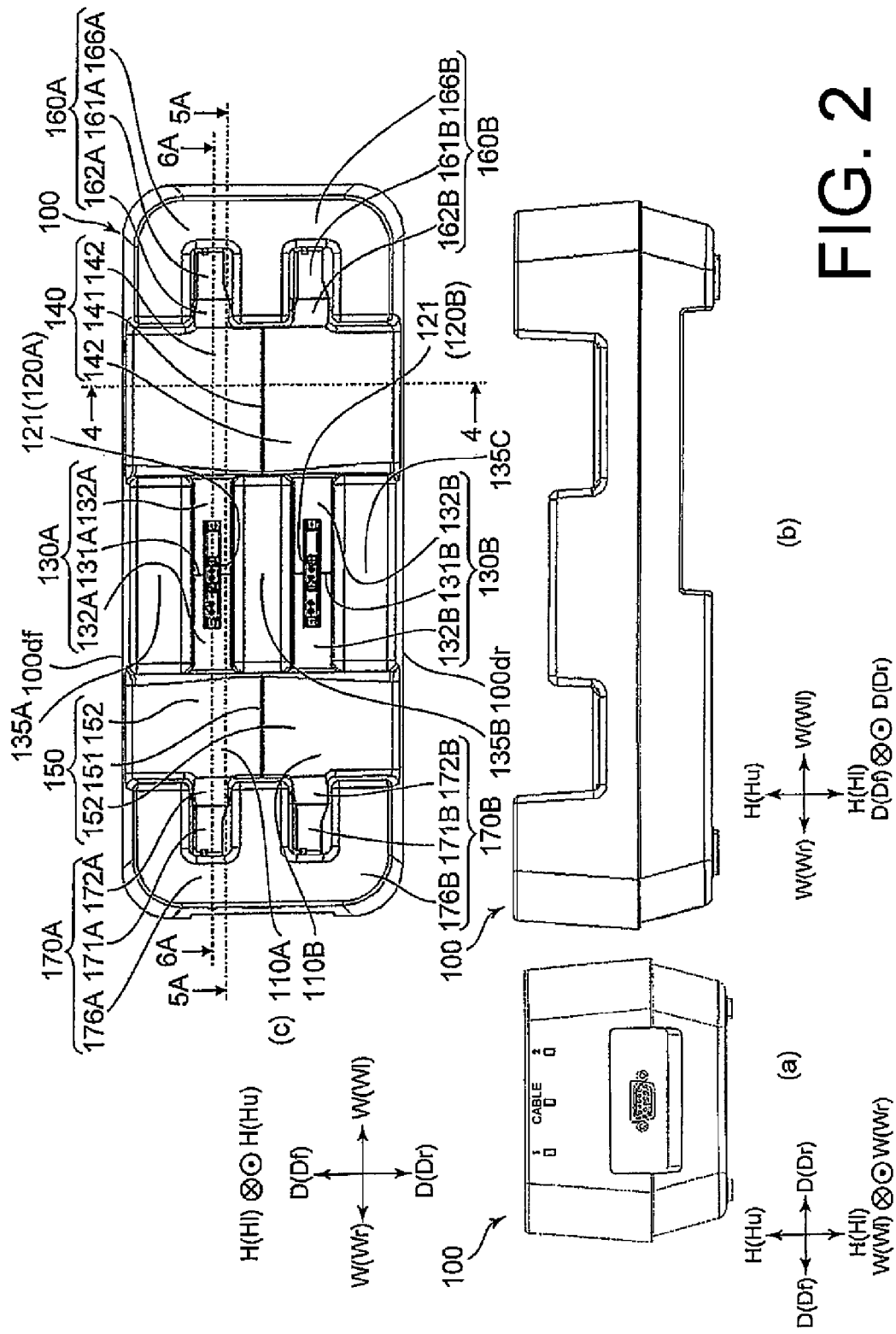
FIG. 2 includes (a), (b), and (c) which are a front view, a side view, and a top view of the charging stand according to the embodiment of this invention, respectively.

A charging stand for a portable terminal device according to an embodiment of this invention includes a terminal placing section, a terminal mounting portion, a left-side top surface portion, and a right-side top surface portion.

The terminal placing section is provided on an upper part of the charging stand, which has a stand width direction being a longitudinal direction of the charging stand and a stand depth direction perpendicular to the stand width direction, so as to extend along the stand width direction. A portable terminal device is to be removably placed onto the terminal placing section. The terminal mounting portion is provided in the terminal placing section. Charging terminals mounted to the terminal mounting portion are configured to come into abutment (contact) with to-be-charged terminals of the portable terminal device placed on the terminal placing section, to thereby charge the portable terminal device.

The left-side top surface portion is provided on the left side of the terminal mounting portion in the stand width direction. The right-side top surface portion is provided on the right side of the terminal mounting portion in the stand width direction.

The terminal mounting portion includes a mounting portion ridge line and two mounting portion inclined surfaces. The mounting portion ridge line extends along the stand depth direction and at a height lower than that of a flat surface present in the terminal mounting portion. The two mounting portion inclined surfaces extend while descending from the mounting portion ridge line to each of the left-side top surface portion and the right-side top surface portion.

The left-side top surface portion includes a left-side top surface portion ridge line and two left-side top surface portion inclined surfaces.

The left-side top surface portion ridge line extends along the stand width direction and at a height lower than that of the mounting portion ridge line. The two left-side top surface portion inclined surfaces extend while descending from the left-side top surface portion ridge line to each of a front end and a rear end in the stand depth direction.

The right-side top surface portion includes a right-side top surface portion ridge line and two right-side top surface portion inclined surfaces.

The right-side top surface portion ridge line extends along the stand width direction and at a height lower than that of the mounting portion ridge line. The two right-side top surface portion inclined surfaces extend while descending from the right-side top surface portion ridge line to each of the front end and the rear end of the charging stand in the stand depth direction.

In other words, the charging stand for a portable terminal device according to this invention has the following configuration. In the vicinity of the charging terminals, in which stagnation of liquid is particularly desired to be prevented of the terminal placing section, there is provided a first-stage drainage structure (terminal mounting portion) formed of a ridge line and a pair of inclined surfaces extending while descending in directions opposite to each other with the ridge line serving as a start end. In addition, there are provided second-stage drainage structures (left-side top surface portion and right-side top surface portion) that are adjacent to the first-stage drainage structure so as to divide the longitudinal direction of the charging stand (terminal placing section) and are at a height lower than that of the first-stage drainage structure. The second-stage drainage structures (left-side top surface portion and right-side top surface portion) are each formed of a ridge line that extends in a direction intersecting with the ridge line of the first-stage drainage structure, and a pair of inclined surfaces extending while descending in directions opposite to each other with the ridge line serving as a start end. That is, in the charging stand according to this invention, liquid spilled on the terminal placing section including the vicinity of the charging terminals is divided by the ridge line of the first-stage drainage structure, and is caused to flow toward the second-stage drainage structures by the pair of inclined surfaces so as to branch off. Each portion of the liquid that is caused to flow so as to be divided and to branch off is further divided by the ridge line of the second-stage drainage structure, which is formed so as to divide the longitudinal direction of the charging stand, and then branches off with use of the pair of inclined surfaces to be drained to the outside of the charging stand. Consequently, in the charging stand according to this invention, although the charging stand includes the terminal placing section extending in the longitudinal direction, the liquid spilled on the terminal placing section is prevented from stagnating in any portion of the terminal placing section extending in the longitudinal direction because the liquid is divided and caused to branch off in each of the two stages so as to be drained.

With the above-mentioned configuration, the charging stand according to this invention is capable of preventing stagnation of accidentally spilled liquid even when the charging stand has a shape having a longitudinal direction. As a result, the liquid, for example, water, does not stagnate in the terminal placing section to cause a short circuit of the charging terminals.

Now, the charging stand for a portable terminal device according to an embodiment of this invention is more specifically described with reference to the drawings.

Figure 4:
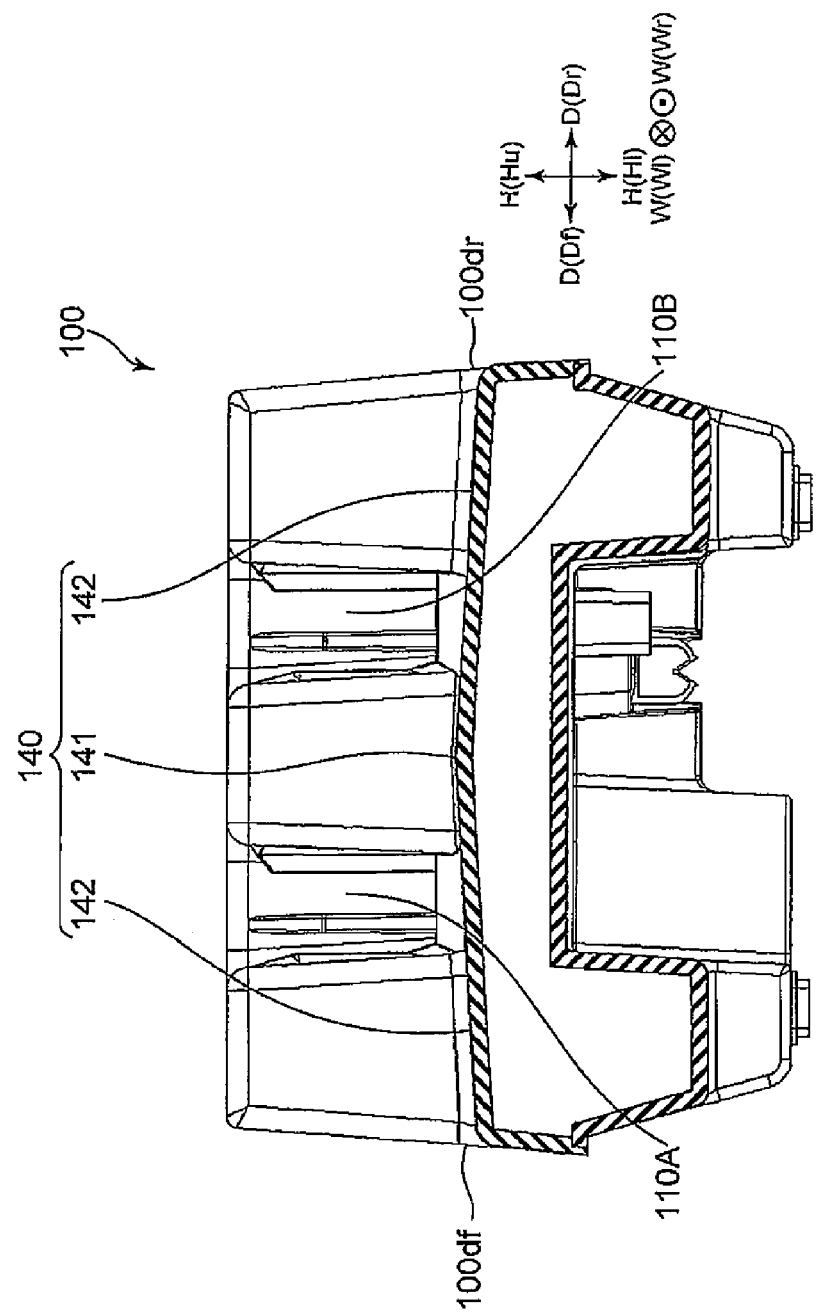
FIG. 4 is a cross-sectional view taken along the line 4-4 of FIG. 2 (c).
Figure 5:
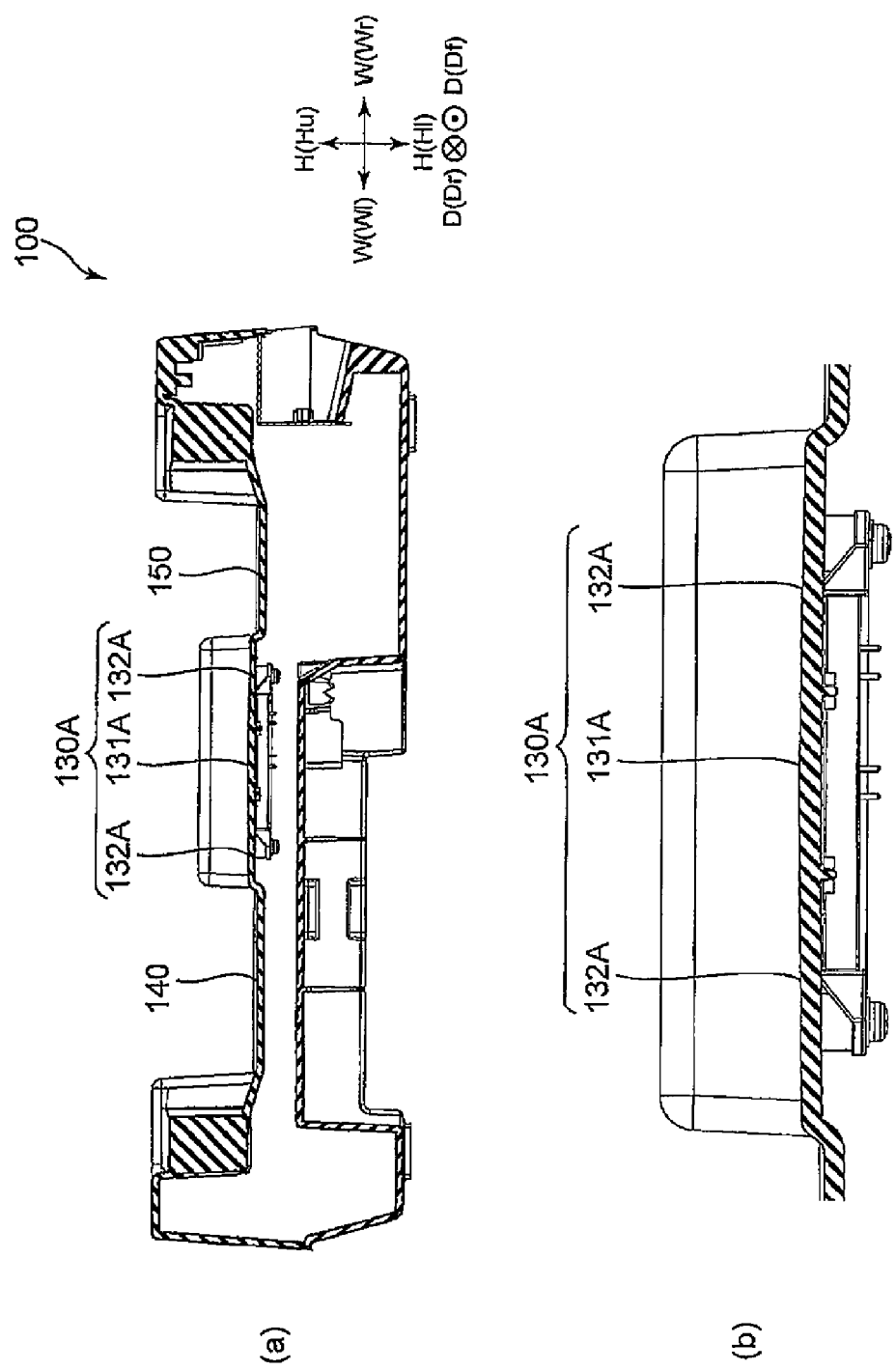
FIG. 5 includes (a) which is a cross-sectional view taken along the line 5A-5A of FIG. 2 (c), and (b) which is a partial enlarged view of FIG. 5 (a).

In FIG. 4, FIG. 5 (a), and FIG. 6 (a), which are cross-sectional views referred to in the following, only components related to a housing of a charging stand 100 are illustrated. An AC adapter built in the housing, electrical components except for charging terminals, cables, and the like are not illustrated.

The charging stand for a portable terminal device according to the embodiment of this invention is used for charging portable terminal devices of a tablet type that are used in a self-ordering system being a mode of the point of sales (POS) system.

Referring to FIG. 1 to FIG. 7, the charging stand 100 for a portable terminal device according to the embodiment of this invention includes two terminal placing sections 110A and 110B, contact pins 121A and 121B serving as charging terminals, terminal mounting portions 130A and 130B, terminal protection portions 135A, 135B, and 135C, a left-side top surface portion 140, a right-side top surface portion 150, left-side guide portions 160A and 160B, and right-side guide portions 170A and 170B.

Figure 3:
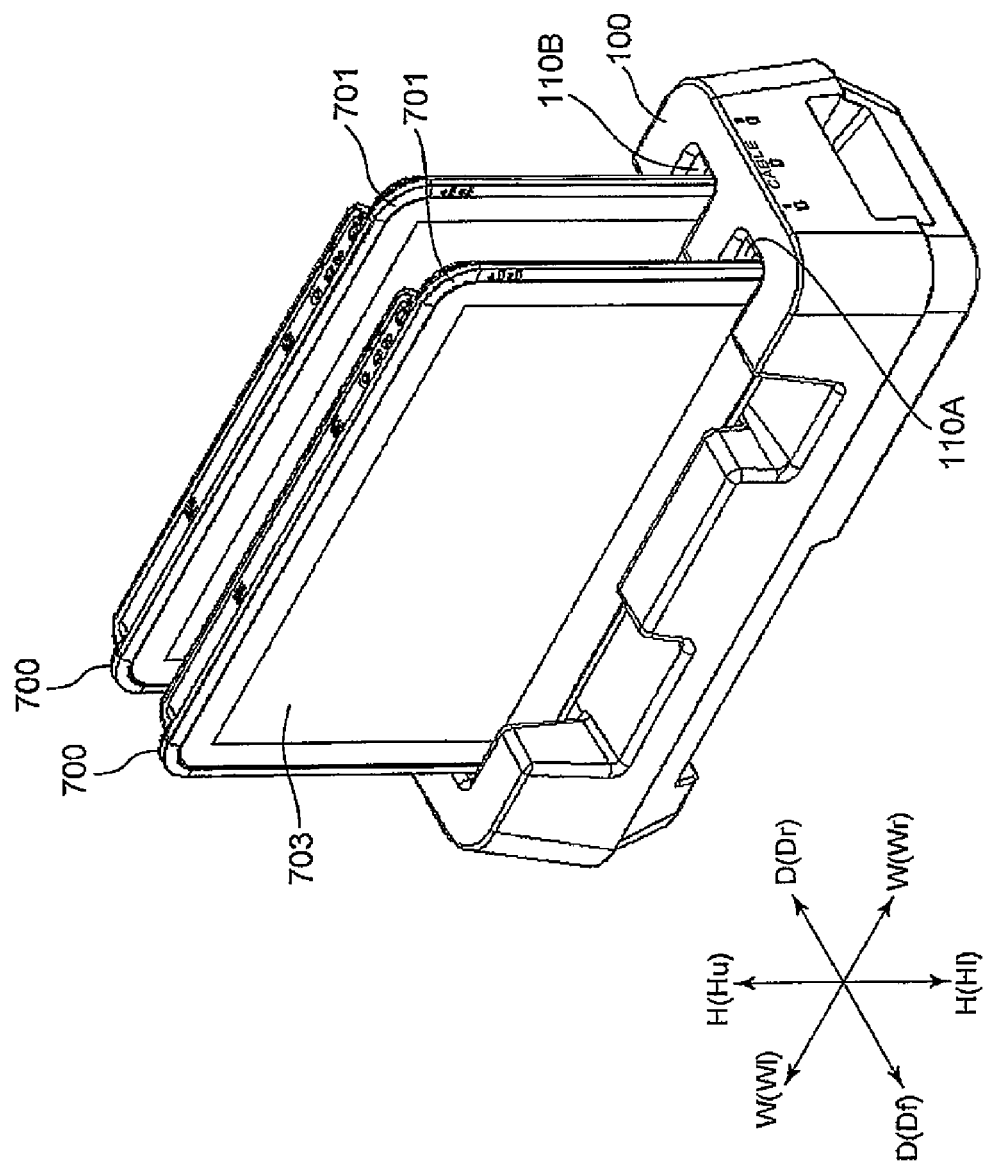
FIG. 3 is a perspective view of a state in which two portable terminal devices are placed on the charging stand according to the embodiment of this invention.

The charging stand 100 is connected to a commercial power supply via an AC cable and an AC plug. However, in FIG. 1, FIG. 2 (a) to FIG. 2 (c), and FIG. 3, illustrations of the AC cable and the AC plug are omitted.

The terminal placing sections 110A and 110B are provided on an upper part of the charging stand. The charging stand has: a stand width direction W (including a left direction Wl and a right direction Wr), which is a longitudinal direction of the charging stand; a stand depth direction D (including a front direction Df and a rear direction Dr), which is perpendicular to the stand width direction W; and a height direction H (including a downward direction Hl and an upward direction Hu), which is perpendicular to the stand width direction W and the stand depth direction D. The terminal placing sections 110A and 110B are formed so as to extend along the stand width direction W, and portable terminal devices 700 are to be removably placed thereon as illustrated in FIG. 3.

The contact pins 121A and 121B serving as the charging terminals are mounted to the terminal mounting portions 130A and 130B, which are provided in the terminal placing sections 110A and 110B, and come into abutment with to-be-charged terminals of the portable terminal device 700, which are to be described later, to perform charging of the portable terminal devices 700 that are placed on the terminal placing sections 110A and 110B.

The terminal protection portions 135A, 135B, and 135C are provided in the front and the rear of the terminal mounting portions 130A and 130B in the stand depth direction D so as to extend along the stand width direction W and protrude upward to protect the contact pins 121A and 121B. The terminal protection portion 135B is used for both the terminal mounting portion 130A and the terminal mounting portion 130B, and is provided between the terminal mounting portion 130A and the terminal mounting portion 130B. The terminal protection portions 135A, 135B, and 135C protect the charging terminals so that no object hits against the charging terminals from the side thereof to damage the charging terminals when no portable terminal device 700 is placed on the charging stand 100.

The left-side top surface portion 140 is provided on the left side of the terminal mounting portions 130A and 130B in the stand width direction W. The right-side top surface portion 150 is provided on the right side of the terminal mounting portions 130A and 130B in the stand width direction W.

The terminal mounting portions 130A and 130B include mounting portion ridge lines 131A and 131B and two mounting portion inclined surfaces 132A and 132B, respectively.

The mounting portion ridge lines 131A and 131B extend along the stand depth direction D and at a height lower than that of flat surfaces present in the terminal mounting portions 130A and 130B. The flat surfaces present in the terminal mounting portions 130A and 130B are to be described later. As illustrated in FIG. 5 (b), the two mounting portion inclined surfaces 132A and 132B extend while descending from the mounting portion ridge lines 131A and 131B, respectively, to each of the left-side top surface portion 140 and the right-side top surface portion 150.

The left-side top surface portion 140 includes a left-side top surface portion ridge line 141 and two left-side top surface portion inclined surfaces 142.

As illustrated in FIG. 5 (a), the left-side top surface portion ridge line 141 extends along the stand width direction W and at a height lower than that of the mounting portion ridge lines 131A and 131B. As illustrated in FIG. 4, the two left-side top surface portion inclined surfaces 142 extend while descending from the left-side top surface portion ridge line 141 to each of a front end 100*df* and a rear end 100*dr* of the charging stand in the stand depth direction D.

The right-side top surface portion 150 includes a right-side top surface portion ridge line 151 and two right-side top surface portion inclined surfaces 152.

As illustrated in FIG. 5 (a), the right-side top surface portion ridge line 151 extends along the stand width direction W and at a height lower than that of the mounting portion ridge lines 131A and 131B. Similarly to the two left-side top surface portion inclined surfaces 142 illustrated in FIG. 4, the two right-side top surface portion inclined surfaces 152 extend while descending from the right-side top surface portion ridge line 151 to each of the front end 100*df* and the rear end 100*dr* of the charging stand in the stand depth direction D.

The left-side guide portions 160A and 160B are provided on the left side of the left-side top surface portion 140 in the stand width direction W to guide left end portions of the portable terminal devices 700 to be placed onto the terminal placing sections 110A and 110B. The right-side guide portions 170A and 170B are provided on the right side of the right-side top surface portion 150 in the stand width direction W to guide right end portions of the portable terminal devices 700 to be placed onto the terminal placing sections 110A and 110B.

The left-side guide portions 160A and 160B include U-shaped wall portions 166A and 166B, left-side guide portion base surfaces 161A and 161B, and left-side guide portion inclined surfaces 162A and 162B, respectively.

The U-shaped wall portions 166A and 166B protrude upward so as to surround the left end portions of the portable terminal devices 700 placed on the terminal placing sections 110A and 110B, respectively. The left-side guide portion base surfaces 161A and 161B have a height higher than that of the left-side top surface portion ridge line 141 inside the U-shaped wall portions 166A and 166B, respectively. The left-side guide portion inclined surfaces 162A and 162B extend while descending from the left-side guide portion base surfaces 161A and 161B to the left-side top surface portion 140, respectively.

The right-side guide portions 170A and 170B include U-shaped wall portions 176A and 176B, right-side guide portion base surfaces 171A and 171B, and right-side guide portion inclined surfaces 172A and 172B, respectively.

The U-shaped wall portions 176A and 176B protrude upward so as to surround the right end portions of the portable terminal devices 700 placed on the terminal placing sections 110A and 110B, respectively. The right-side guide portion base surfaces 171A and 171B have a height higher than that of the right-side top surface portion ridge line 151 inside the U-shaped wall portions 176A and 176B, respectively. The right-side guide portion inclined surfaces 172A and 172B extend while descending from the right-side guide portion base surfaces 171A and 171B to the right-side top surface portion 150, respectively.

With the above-mentioned configuration, in the charging stand 100, even when liquid, for example, water, is accidentally spilled on the terminal placing sections 110A and 110B including the charging terminals and the vicinities thereof, the liquid sequentially flows to lower portions. Finally, the liquid is drained to the outside of the charging stand from the front end 100df and the rear end 100dr of the charging stand 100 by flowing over the left-side top surface portion inclined surfaces 142 of the left-side top surface portion 140 and the right-side top surface portion inclined surfaces 152 of the right-side top surface portion 150.

Figure 11:
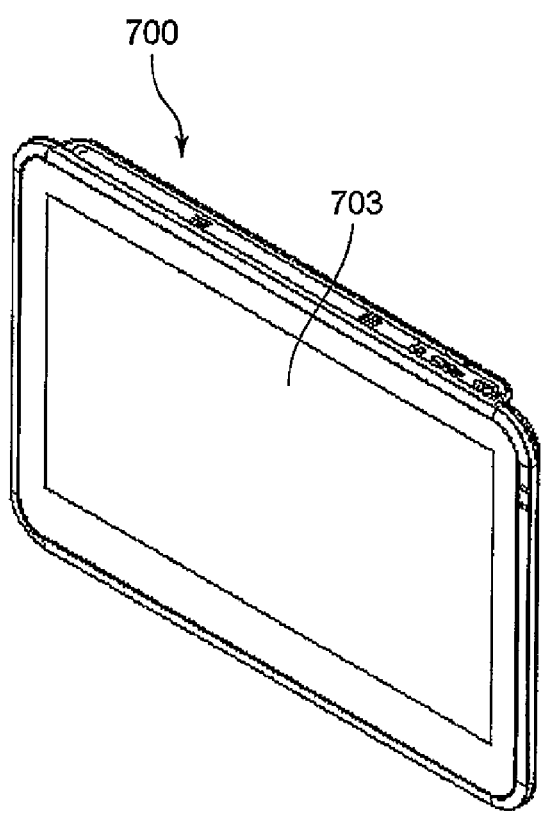
FIG. 11 is a perspective view of a portable terminal device that is capable of being charged with use of a charging stand and for which the embodiment of this invention is employed.
Figure 12:
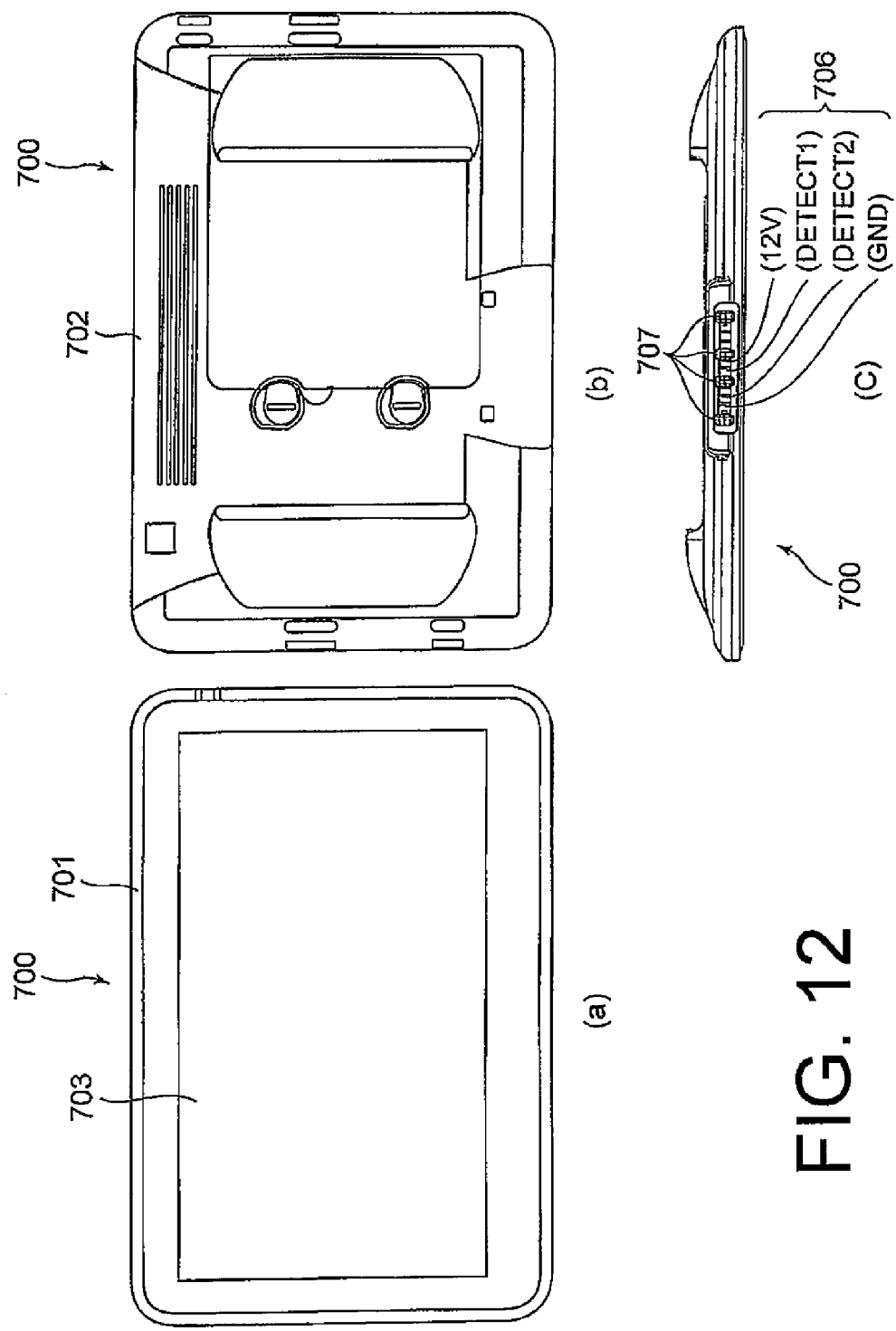
FIG. 12 includes (a), (b), and (c) which are a front view, a rear view, and a bottom view of the portable terminal device for which the embodiment of this invention is employed, respectively.
Figure 13:
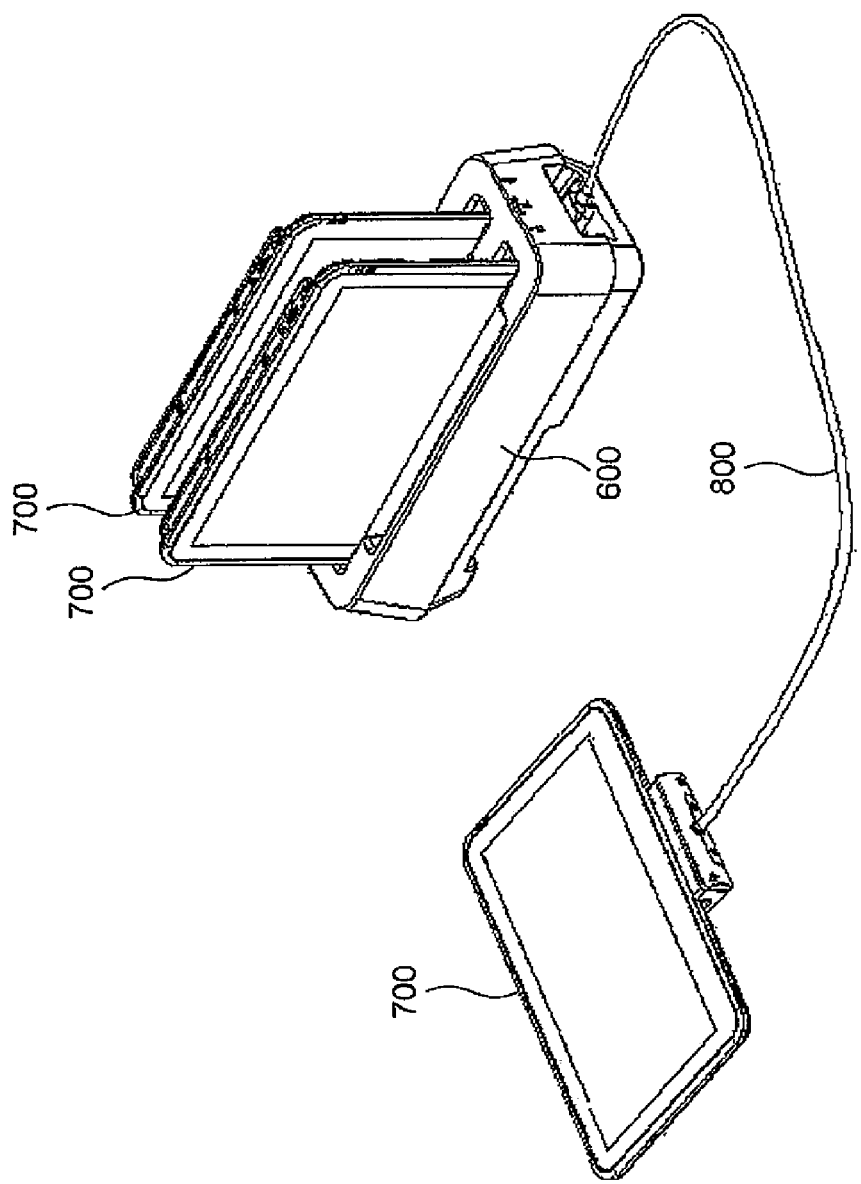
FIG. 13 is a view of the related-art charging stand, on which two portable terminal devices are placed, and to which a portable terminal device is connected via a charging cable.

As illustrated in FIG. 11 and FIG. 12 (a) to FIG. 12 (c), the portable terminal device 700, which is the target device of the charging stand 100, includes: a housing, which is formed of a front panel 701 and a rear panel 702; a display 703 including a touch panel, which is arranged on a front surface of the housing; four to-be-charged terminals 706 (12V, DETECT1, DETECT2, and GND), each of which is provided on a bottom surface of the housing; and four terminal-adjacent recessed portions 707. The portable terminal device 700 is a portable terminal device that operates with a battery installed therein serving as a power source.

Now, the charging stand 100 for a portable terminal device according to the embodiment is more specifically described.

Figure 10:
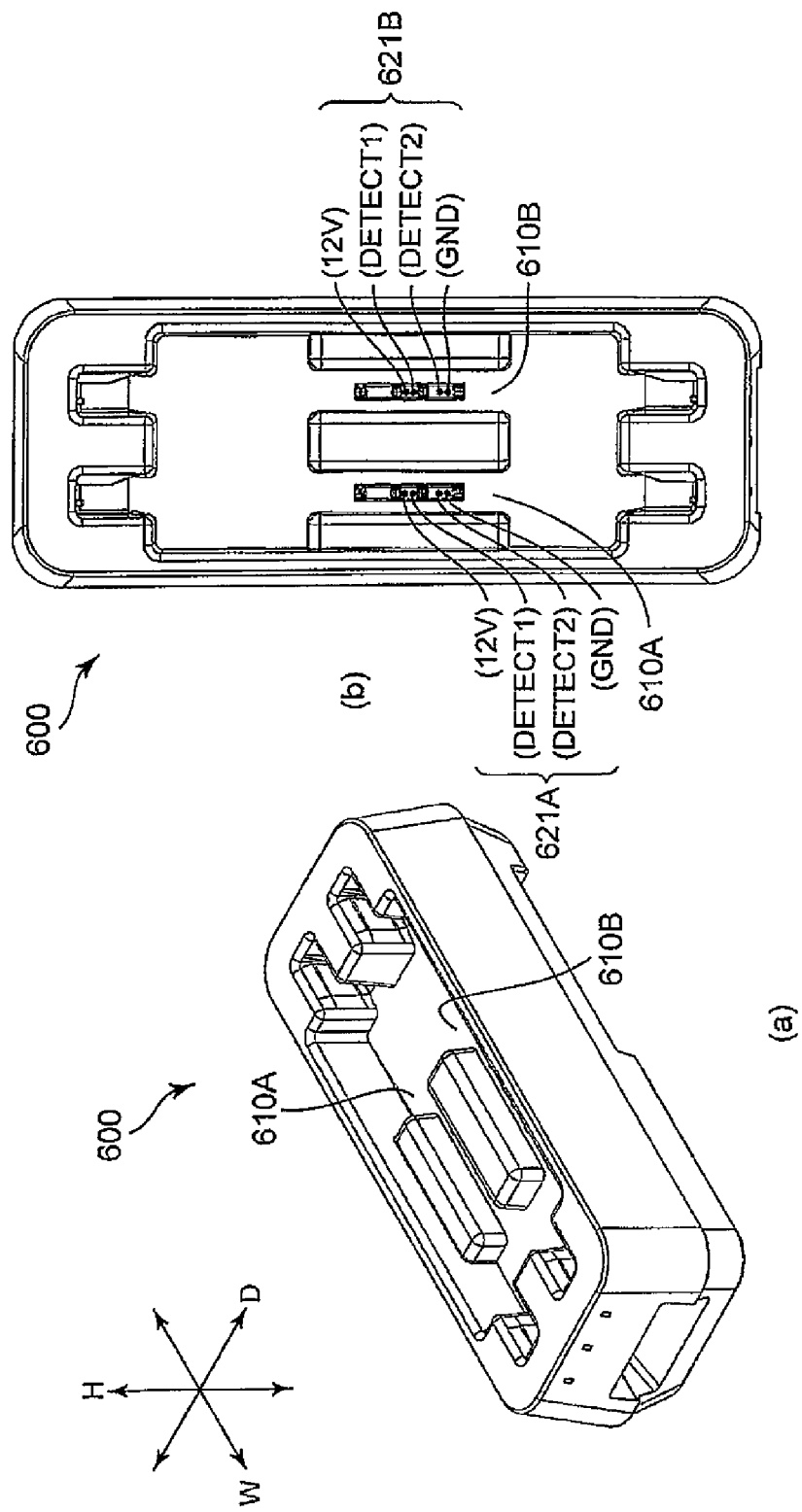
FIG. 10 includes (a) and (b) which are a perspective view and a top view of a related-art charging stand, respectively.

The charging stand 100 includes the terminal placing sections 110A and 110B at two portions. As illustrated in FIG. 3, two portable terminal devices 700 can be placed on the charging stand 100 to be charged. Similarly to the charging stand 600 in the related art illustrated in FIG. 10, the charging stand 100 can charge a portable terminal device even when the portable terminal device is not placed on the terminal mounting portion, by connecting a charging cable to a receptacle connector provided in the charging stand and mounting an attachment of the charging cable to the portable terminal device 700. However, this feature is irrelevant for this invention, and hence further description and illustration thereof are omitted. The charging stand may not include the receptacle connector for connecting the charging cable thereto, and may be configured such that the charging with use of the charging cable cannot be performed.

In this embodiment, the two mounting portion inclined surfaces 132A and the two mounting portion inclined surfaces 132B each have an inclination angle of 0.5 degrees or more with respect to a horizontal plane. Further, the two left-side top surface portion inclined surfaces 142 and the two right-side top surface portion inclined surfaces 152 each have an inclination angle of 3 degrees or more with respect to the horizontal plane. In addition, the mounting portion ridge lines 131A and 131B have the same height, and pass through centers of the terminal mounting portions 130A and 130B in the stand width direction W, respectively. The two mounting portion inclined surfaces 132A and 132B have the same length in the stand width direction W, and the same inclination angle with respect to the horizontal plane. Further, the left-side top surface portion ridge line 141 and the right-side top surface portion ridge line 151 have the same height.

Figure 7:
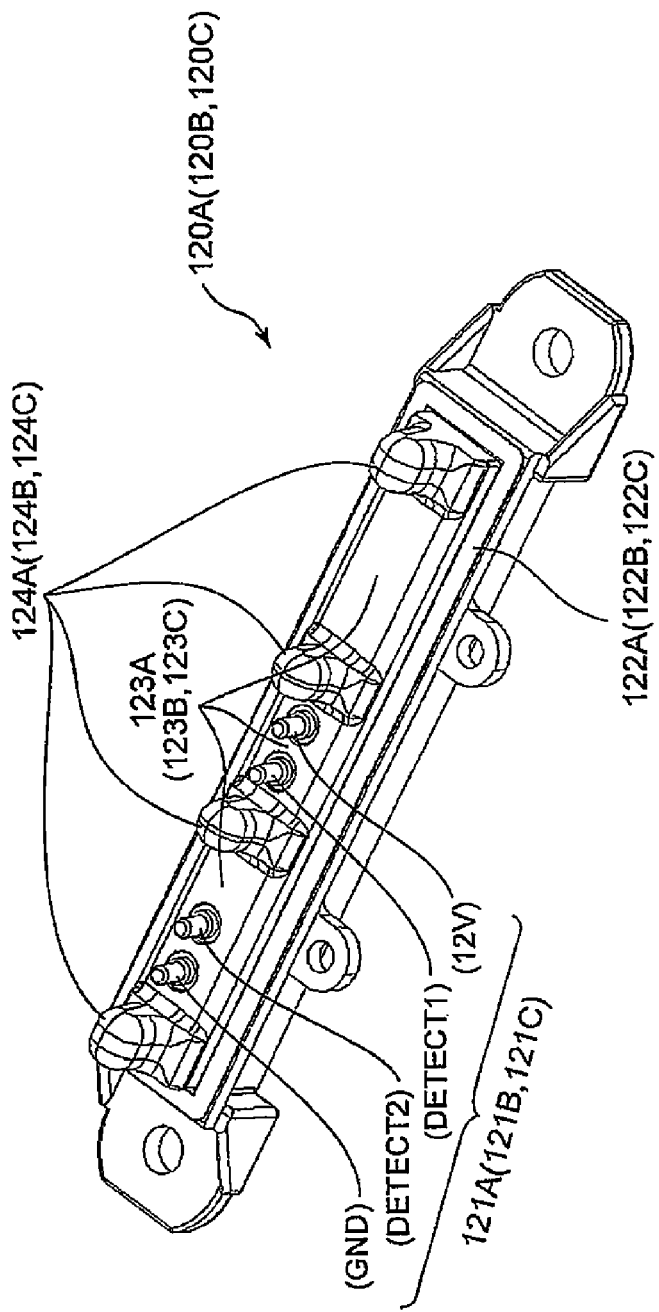
FIG. 7 is a perspective view only of the charging terminal portion.

In addition, in this embodiment, the charging stand 100 includes, in the form of charging terminal portions, four contact pins 121A and 121B serving as the charging terminals. That is, as illustrated in FIG. 7, charging terminal portions 120A and 120B include four contact pins 121A and 121B, the housings 122A and 122B, and four guide projection portions 124A and 124B, respectively.

The four contact pins 121A and 121B each have a pin sequence (12V, DETECT1, DETECT2, and GND) corresponding to the four to-be-charged terminals 706 (FIG. 12 (c)) of the portable terminal device 700. The four contact pins 121A and 121B are pins of a probe-pin type, which have elasticity given by springs. The housings 122A and 122B retain the contact pins 121A and 121B, respectively. The four guide projection portions 124A and 124B are provided in the housings 122A and 122B, respectively, so as to correspond to the four terminal-adjacent recessed portions 707 (FIG. 12 (c)) of the portable terminal device 700.

The housings 122A and 122B have terminal portion top surfaces 123A and 123B, respectively, two screw fastening holes, and two positioning holes. The terminal portion top surfaces 123A and 123B are the above-mentioned flat surfaces present in the terminal mounting portions 130A and 130B, respectively. As illustrated in FIG. 6 (c), the charging terminal portion 120A is screwed on an inner side surface of the housing of the charging stand 100. Similarly, the charging terminal portion 120B is also screwed on the inner side surface of the housing of the charging stand 100.

Figure 6:
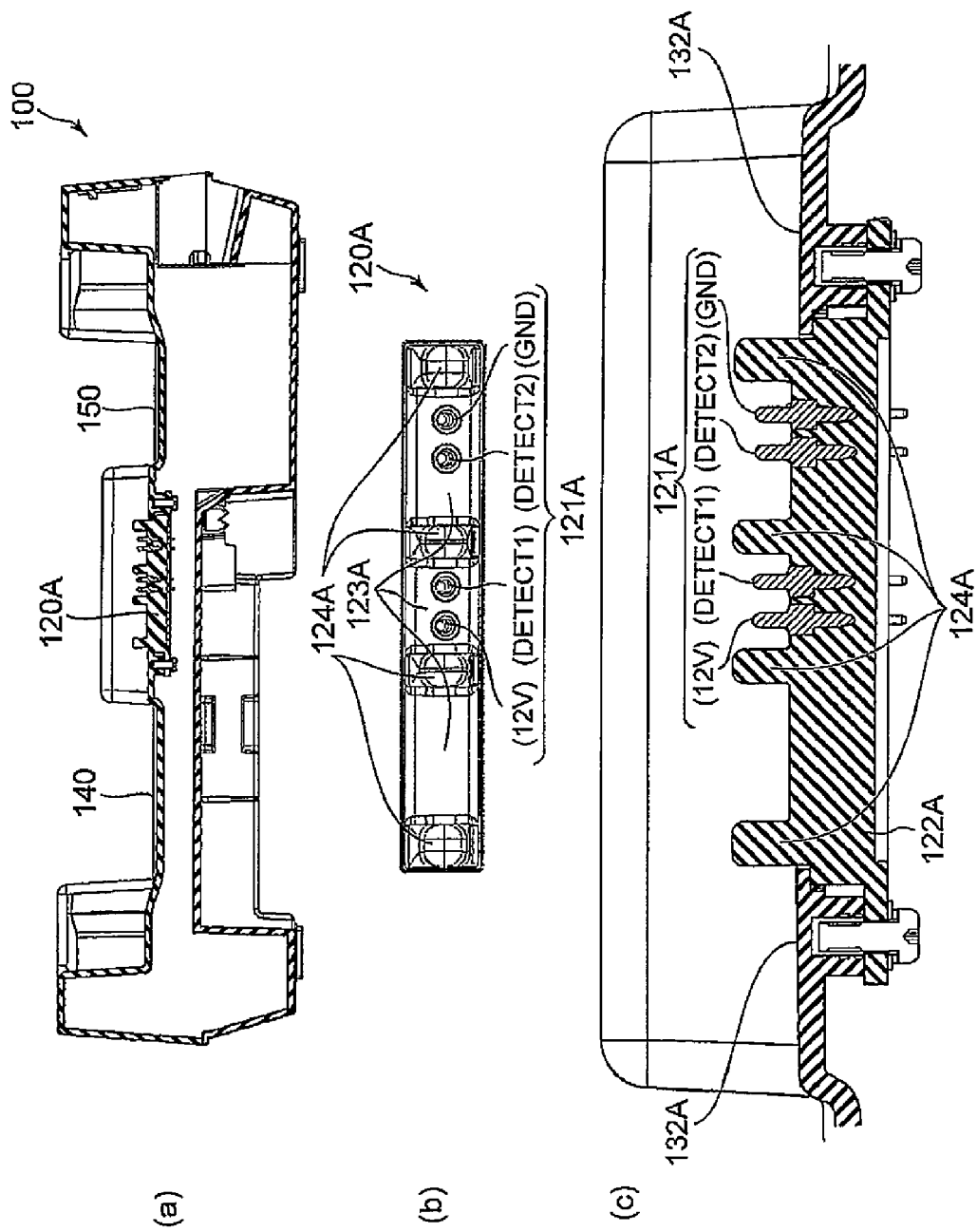
FIG. 6 includes (a) which is a cross-sectional view taken along the line 6A-6A of FIG. 2 (c), (b) which is an enlarged top view only of a charging terminal portion, and (c) which is a partial enlarged view of FIG. 6 (a).

Further, as understood from the fact that the four contact pins 121A are not concentrically drawn in FIG. 6 (b) being a top view, the four contact pins 121A are provided so as to be inclined backward in the charging terminal portion 120A. Similarly, also in the charging terminal portion 120B, the four contact pins 121B are provided so as to be inclined backward.

Further, of each of the four contact pins 121A and 121B, a 12V-pin and a GND-pin are used for supplying a charging voltage, and a DETECT1-pin and a DETECT2-pin (also including the GND-pin in some cases) are used for detecting that the portable terminal device is placed on the charging stand 100.

A watertight structure is provided between the terminal mounting portions 130A and 130B and the charging terminal portions 120A and 120B with use of a double-sided tape, a packing element, and the like so that the liquid, for example, water, is prevented from infiltrating into the charging stand 100 by passing between vicinities of portions of the charging terminal portions 120A and 120B that are exposed on the charging stand 100, and rear surfaces of the terminal mounting portions 130A and 130B.

As illustrated in FIG. 6 (c), the terminal portion top surface 123A of the charging terminal portion 120A has a height higher than that of the mounting portion inclined surface 132A. In addition, although it is not apparent in FIG. 6 (c), the terminal portion top surface 123A of the charging terminal portion 120A has a height higher than that of the mounting portion ridge line 131A. Similarly, the terminal portion top surface 123B of the charging terminal portion 120B has a height higher than that of the mounting portion inclined surface 132B and the mounting portion ridge line 131B. Accordingly, the liquid, for example, water, that is dropped onto the charging terminal portions 120A and 120B flows down onto the mounting portion inclined surfaces 132A and 132B to further flow down to the left-side top surface portion 140 and the right-side top surface portion 150 along the mounting portion inclined surfaces 132A and 132B. Then, the liquid flows along the left-side top surface portion 140 and the right-side top surface portion 150 to be drained to the outside of the charging stand 100.

The terminal portion top surfaces 123A and 123B of the charging terminal portions 120A and 120B may have the same height as the mounting portion ridge lines 131A and 131B, respectively. That is, it is only required that the mounting portion ridge lines 131A and 131B have a height equal to or lower than that of the terminal portion top surfaces 123A and 123B, which are the flat surfaces present in the terminal mounting portions 130A and 130B, respectively. Alternatively, the terminal portion top surfaces 123A and 123B of the charging terminal portions 120A and 120B may have a shape including a ridge line on a center line of the charging terminal portions 120A and 120B in the stand depth direction D so that the liquid, for example, water, that is spilled on the terminal portion top surfaces 123A and 123B flows down onto the mounting portion inclined surfaces 132A and 132B. Still alternatively, the terminal portion top surfaces 123A and 123B except for the four guide projection portions may have a shape including a ridge line that forms one straight line together with the mounting portion ridge lines 131A and 131B and inclined surfaces that are continuous with the mounting portion inclined surfaces 132A and 132B without any steps. Yet alternatively, the charging terminal portions 120A and 120B may not be separately provided, but the four contact pins serving as the charging terminals and the four guide projection portions may be directly provided on the mounting portion inclined surfaces 132A and 132B.

The left-side guide portion inclined surfaces 162A and 162B and the right-side guide portion inclined surfaces 172A and 172B are provided so as mainly to facilitate the placing of the portable terminal device 700. A user may perform the following operation to charge the portable terminal device 700. Specifically, the user grips the portable terminal device 700 by his or her hand to support the portable terminal device 700 obliquely, and then causes the lower left corner portion of the portable terminal device 700 to come into abutment with or closer to the left-side top surface portion 140. Subsequently, the user shifts the portable terminal device 700 in the direction of the left-side guide portion 160A or 160B, and causes the portable terminal device 700 to climb on the left-side guide portion base surface 161A or 161B along the left-side guide portion inclined surface 162A or 162B. After that, the user lowers the lower right corner portion of the portable terminal device 700 to place the portable terminal device 700 onto the charging stand 100. Alternatively, the user grips the portable terminal device 700 by his or her hand to support the portable terminal device 700 obliquely, and then causes the lower right corner portion of the portable terminal device 700 to come into abutment with or closer to the right-side top surface portion 150. Subsequently, the user shifts the portable terminal device 700 in the direction of the right-side guide portion 170A or 170B, and causes the portable terminal device 700 to climb on the right-side guide portion base surface 171A or 171B along the right-side guide portion inclined surface 172A or 172B. After that, the user lowers the lower left corner portion of the portable terminal device 700 to place the portable terminal device 700 onto the charging stand 100. The left-side guide portion inclined surfaces 162A and 162B and the right-side guide portion inclined surfaces 172A and 172B exhibit an effect of causing the liquid, for example, water, that is spilled on the U-shaped wall portions 166A and 166B and the U-shaped wall portions 176A and 176B to flow down toward the left-side top surface portion 140 and the right-side top surface portion 150. Further, when the portable terminal device 700 is to be placed onto the charging stand 100 only from an upward direction of the terminal placing sections, the left-side guide portion inclined surfaces and the right-side guide portion inclined surfaces are not necessarily required to be provided.

MODIFICATION EXAMPLE 1

A charging stand for a portable terminal device according to Modification Example 1 of the embodiment of this invention differs from the above-mentioned embodiment in the number of the terminal placing sections. Therefore, for the same or similar portions as those of the embodiment, the drawings and descriptions of the embodiment are referred to as a reference, and illustrations and detailed description thereof are omitted.

Figure 8:
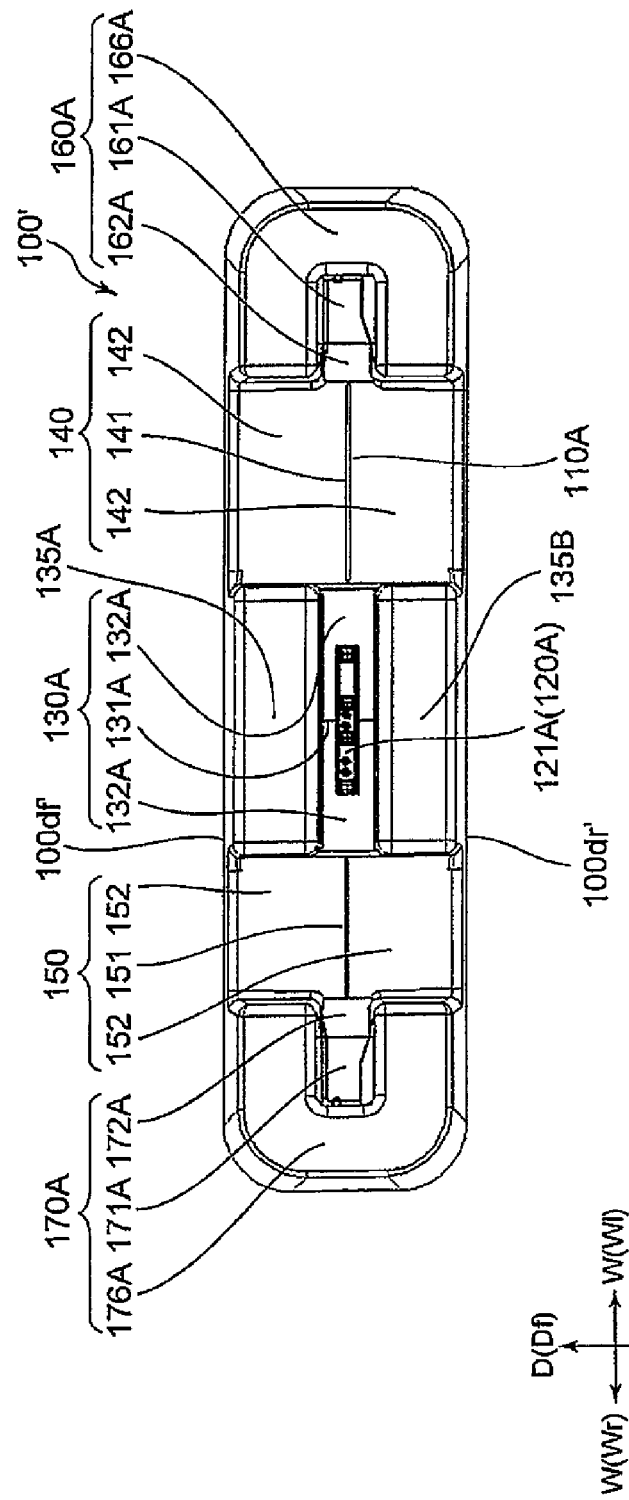
FIG. 8 is a top view of a charging stand according to a modification example of the embodiment of this invention.

Referring to FIG. 8, a charging stand 100' according to Modification Example 1 of the embodiment of this invention includes one terminal placing section 110A, a terminal mounting portion 130A to which contact pins 121A serving as charging terminals are mounted, terminal protection portions 135A and 135B, a left-side top surface portion 140, a right-side top surface portion 150, a left-side guide portion 160A, and a right-side guide portion 170A.

The terminal placing section 110A is provided on an upper part of the charging stand. The charging stand has: a stand width direction W, which is a longitudinal direction of the charging stand; and a stand depth direction D, which is perpendicular to the stand width direction W. The terminal placing section 110A is formed so as to extend along the stand width direction W, and a portable terminal device is to be removably placed thereon.

The contact pins 121A serving as the charging terminals are mounted to the terminal mounting portion 130A, which is provided in the terminal placing section 110A, and come into abutment with to-be-charged terminals of the portable terminal device placed on the terminal placing section 110A to perform charging of the portable terminal device.

The terminal protection portions 135A and 135B are provided in the front and the rear of the terminal mounting portions 130A in the stand depth direction D so as to extend along the stand width direction W and protrude upward to protect the contact pins 121A. The terminal protection portions 135A and 135B protect the charging terminals so that no object hits against the charging terminals from the side thereof to damage the charging terminals when no portable terminal device is placed on the charging stand 100.

The left-side top surface portion 140 is provided on the left side of the terminal mounting portion 130A in the stand width direction W. The right-side top surface portion 150 is provided on the right side of the terminal mounting portion 130A in the stand width direction W.

The terminal mounting portion 130A includes a mounting portion ridge line 131A and two mounting portion inclined surfaces 132A.

The mounting portion ridge line 131A extends along the stand depth direction D and at a height lower than that of a flat surface present in the terminal mounting portion 130A. The flat surface present in the terminal mounting portion 130A is a terminal portion top surface 123A of a charging terminal portion 120A, in which the contact pins 121A are provided. The terminal portion top surface 123A of the charging terminal portion 120A may have the same height as the mounting portion ridge line 131A. The two mounting portion inclined surfaces 132A extend while descending from the mounting portion ridge line 131A to each of the left-side top surface portion 140 and the right-side top surface portion 150.

The left-side top surface portion 140 includes a left-side top surface portion ridge line 141 and two left-side top surface portion inclined surfaces 142.

The left-side top surface portion ridge line 141 extends along the stand width direction W and at a height lower than that of the mounting portion ridge line 131A. The two left-side top surface portion inclined surfaces 142 extend while descending from the left-side top surface portion ridge line 141 to each of a front end 100*df* and a rear end 100*dr*' of the charging stand in the stand depth direction D.

The right-side top surface portion 150 includes a right-side top surface portion ridge line 151 and two right-side top surface portion inclined surfaces 152.

The right-side top surface portion ridge line 151 extends along the stand width direction W and at a height lower than that of the mounting portion ridge line 131A. The two right-side top surface portion inclined surfaces 152 extend while descending from the right-side top surface portion ridge line 151 to each of the front end 100*df* and the rear end 100*dr*' of the charging stand in the stand depth direction D.

The left-side guide portion 160A is provided on the left side of the left-side top surface portion 140 in the stand width direction W to guide a left end portion of the portable terminal device to be placed onto the terminal placing section 110A. The right-side guide portion 170A is provided on the right side of the right-side top surface portion 150 in the stand width direction W to guide a right end portion of the portable terminal device to be placed onto the terminal placing section 110A.

The left-side guide portion 160A includes a U-shaped wall portion 166A, a left-side guide portion base surface 161A, and a left-side guide portion inclined surface 162A.

The U-shaped wall portion 166A protrudes upward so as to surround the left end portion of the portable terminal device placed on the terminal placing section 110A. The left-side guide portion base surface 161A has a height higher than that of the left-side top surface portion ridge line 141 inside the U-shaped wall portion 166A. The left-side guide portion inclined surface 162A extends while descending from the left-side guide portion base surface 161A to the left-side top surface portion 140.

The right-side guide portion 170A includes a U-shaped wall portion 176A, a right-side guide portion base surface 171A, and a right-side guide portion inclined surface 172A.

The U-shaped wall portion 176A protrudes upward so as to surround the right end portion of the portable terminal device placed on the terminal placing section 110A. The right-side guide portion base surface 171A has a height higher than that of the right-side top surface portion ridge line 151 inside the U-shaped wall portion 176A. The right-side guide portion inclined surface 172A extends while descending from the right-side guide portion base surface 171A to the right-side top surface portion 150.

With the above-mentioned configuration, in the charging stand 100', even when liquid, for example, water, is accidentally spilled on the terminal placing section 110A including the charging terminals and the vicinities thereof, the liquid sequentially flows to lower portions. Finally, the liquid is drained to the outside of the charging stand from the front end 100*df* and the rear end 100*dr*' of the charging stand 100' by flowing over the left-side top surface portion inclined surfaces 142 of the left-side top surface portion 140 and the right-side top surface portion inclined surfaces 152 of the right-side top surface portion 150.

MODIFICATION EXAMPLE 2

A charging stand for a portable terminal device according to Modification Example 2 of the embodiment of this invention also differs from the above-mentioned embodiment in the number of the terminal placing sections. Therefore, for the same or similar portions as those of the embodiment, the drawings and descriptions of the embodiment are referred to as a reference, and illustrations and detailed description thereof are omitted.

Figure 9:
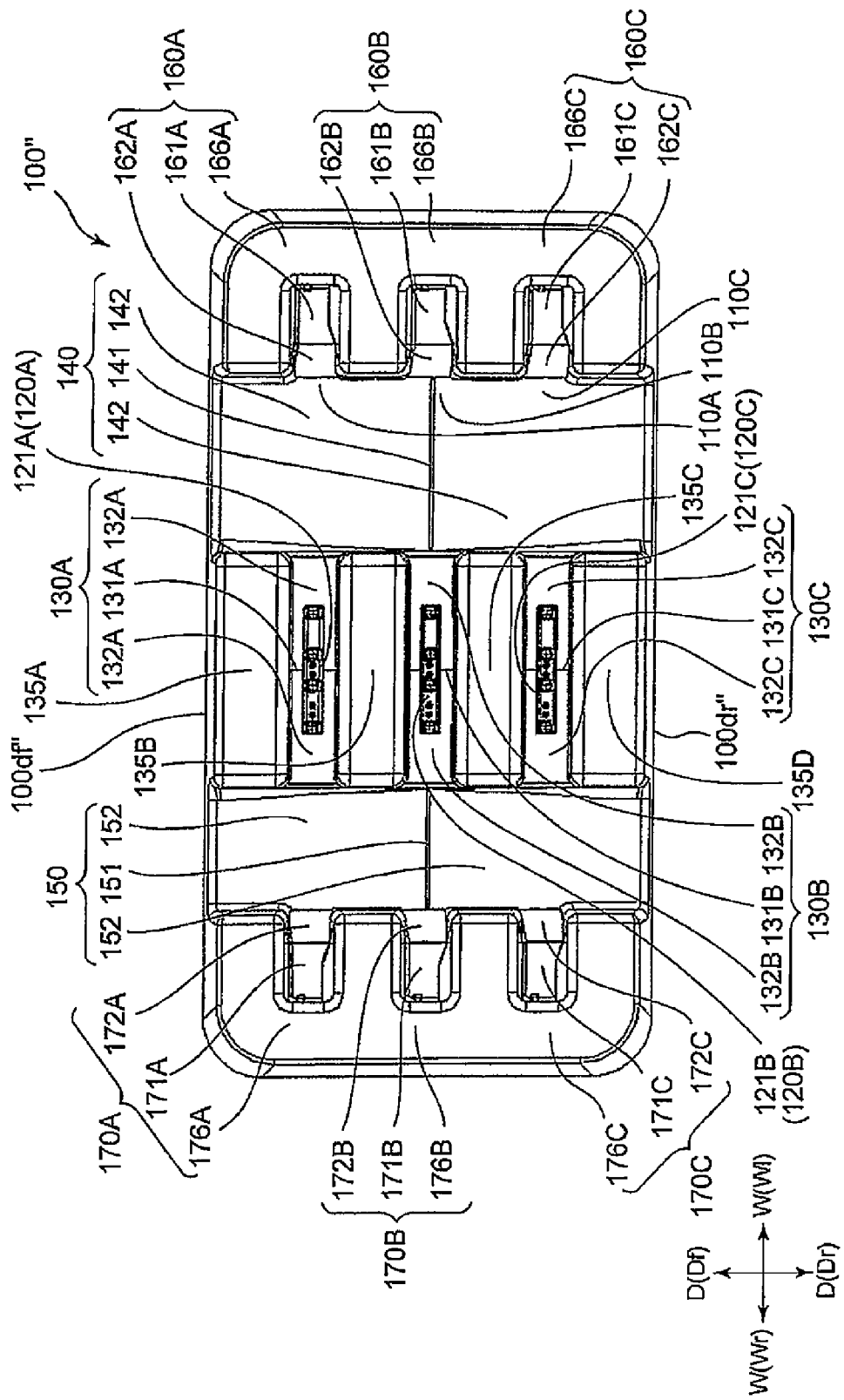
FIG. 9 is a top view of a charging stand according to another modification example of the embodiment of this invention.

Referring to FIG. 9, a charging stand 100" according to Modification Example 2 of the embodiment of this invention includes three terminal placing sections 110A, 110B, and 110C, terminal mounting portions 130A, 130B, and 130C to which contact pins 121A, 121B, and 121C serving as charging terminals are mounted, terminal protection portions 135A, 135B, 135C, and 135D, a left-side top surface portion 140, a right-side top surface portion 150, left-side guide portions 160A, 160B, and 160C, and right-side guide portions 170A, 170B, and 170C.

The terminal placing sections 110A, 110B, and 110C are formed so as to extend along the stand width direction W, respectively, which are provided on an upper part of the charging stand. The charging stand has: a stand width direction W, which is a longitudinal direction of the charging stand; and a stand depth direction D, which is perpendicular to the stand width direction W. Portable terminal devices are to be removably placed on the terminal placing sections 110A, 110B, and 110C.

The contact pins 121A, 121B, and 121C serving as the charging terminals are provided in the terminal placing sections 110A, 110B, and 110C, respectively, and come into abutment with to-be-charged terminals of the portable terminal devices placed on the terminal placing sections 110A, 110B, and 110C to perform charging of the portable terminal devices.

The terminal protection portions 135A, 135B, 135C, and 135D are provided in the front and the rear of the terminal mounting portions 130A, 130B, and 130C in the stand depth direction D so as to extend along the stand width direction W and protrude upward to protect the contact pins 121A, 121B, and 121C. The terminal protection portion 135B is used for both the terminal mounting portion 130A and the terminal mounting portion 130B, and is provided between the terminal mounting portion 130A and the terminal mounting portion 130B. The terminal protection portion 135C is used for both the terminal mounting portion 130B and the terminal mounting portion 130C, and is provided between the terminal mounting portion 130B and the terminal mounting portion 130C.

The left-side top surface portion 140 is provided on the left side of the terminal mounting portions 130A, 130B, and 130C in the stand width direction W. The right-side top surface portion 150 is provided on the right side of the terminal mounting portions 130A, 130B, and 130C in the stand width direction W.

The terminal mounting portions 130A, 130B, and 130C include mounting portion ridge lines 131A, 131B, and 131C and two mounting portion inclined surfaces 132A, 132B, and 132C, respectively.

The mounting portion ridge lines 131A, 131B, and 131C extend along the stand depth direction D and at a height lower than that of flat surfaces present in the terminal mounting portions 130A, 130B, and 130C. The flat surfaces present in the terminal mounting portions 130A, 130B, and 130C are terminal portion top surfaces 123A, 123B, and 123C of charging terminal portions 120A, 120B, and 120C, in which the contact pins 121A, 121B, and 121C are provided, respectively. The terminal portion top surfaces 123A, 123B, and 123C of the charging terminal portions 120A, 120B, and 120C may have the same height as the mounting portion ridge lines 131A, 131B, and 131C. The two mounting portion inclined surfaces 132A, 132B, and 132C extend while descending from the mounting portion ridge lines 131A, 131B, and 131C, respectively, to each of the left-side top surface portion 140 and the right-side top surface portion 150.

The left-side top surface portion 140 includes a left-side top surface portion ridge line 141 and two left-side top surface portion inclined surfaces 142.

The left-side top surface portion ridge line 141 extends along the stand width direction W and at a height lower than that of the mounting portion ridge lines 131A, 131B, and 131C. The two left-side top surface portion inclined surfaces 142 extend while descending from the left-side top surface portion ridge line 141 to each of a front end 100$df''$ and a rear end 100$dr''$ of the charging stand in the stand depth direction D.

The right-side top surface portion 150 includes a right-side top surface portion ridge line 151 and two right-side top surface portion inclined surfaces 152.

The right-side top surface portion ridge line 151 extends along the stand width direction W and at a height lower than that of the mounting portion ridge lines 131A, 131B, and 131C. The two right-side top surface portion inclined surfaces 152 extend while descending from the right-side top surface portion ridge line 151 to each of the front end 100$df''$ and the rear end 100$dr''$ of the charging stand in the stand depth direction D.

The left-side guide portions 160A, 160B, and 160C are provided on the left side of the left-side top surface portion 140 in the stand width direction W to guide left end portions of the portable terminal devices to be placed onto the terminal placing sections 110A, 110B, and 110C. The right-side guide portions 170A, 170B, and 170C are provided on the right side of the right-side top surface portion 150 in the stand width direction W to guide right end portions of the portable terminal devices to be placed onto the terminal placing sections 110A, 110B, and 110C.

The left-side guide portions 160A, 160B, and 160C include U-shaped wall portions 166A, 166B, and 166C, left-side guide portion base surfaces 161A, 161B, and 161C, and left-side guide portion inclined surfaces 162A, 162B, and 162C, respectively.

The U-shaped wall portions 166A, 166B, and 166C protrude upward so as to surround the left end portions of the portable terminal devices placed on the terminal placing sections 110A, 110B, and 110C, respectively. The left-side guide portion base surfaces 161A, 161B, and 161C have a height higher than that of the left-side top surface portion ridge line 141 inside the U-shaped wall portions 166A, 166B, and 166C, respectively. The left-side guide portion inclined surfaces 162A, 162B, and 162C extend while descending from the left-side guide portion base surfaces 161A, 161B, and 161C to the left-side top surface portion 140, respectively.

The right-side guide portions 170A, 170B, and 170C include U-shaped wall portions 176A, 176B, and 176C, right-side guide portion base surfaces 171A, 171B, and 171C, and right-side guide portion inclined surfaces 172A, 172B, and 172C, respectively.

The U-shaped wall portions 176A, 176B, and 176C protrude upward so as to surround the right end portions of the portable terminal devices placed on the terminal placing sections 110A, 110B, and 110C, respectively. The right-side guide portion base surfaces 171A, 171B, and 171C have a height higher than that of the right-side top surface portion ridge line 151 inside the U-shaped wall portions 176A, 176B, and 176C, respectively. The right-side guide portion inclined surfaces 172A, 172B, and 172C extend while descending from the right-side guide portion base surfaces 171A, 171B, and 171C to the right-side top surface portion 150, respectively.

With the above-mentioned configuration, in the charging stand 100", even when liquid, for example, water, is accidentally spilled on the terminal placing sections 110A, 110B, and 110C including the charging terminals and the vicinities thereof, the liquid sequentially flows to lower portions. Finally, the liquid is drained to the outside of the charging stand from the front end 100$df''$ and the rear end 100$dr''$ of the charging stand 100" by flowing over the left-side top surface portion inclined surfaces 142 of the left-side top surface portion 140 and the right-side top surface portion inclined surfaces 152 of the right-side top surface portion 150.

In the embodiment including the modification examples thereof, the mounting portion inclined surfaces have the inclination angle of 0.5 degrees or more with respect to the horizontal plane, and the left-side top surface portion inclined surface and the right-side top surface portion inclined surface have the inclination angle of 3 degrees or more with respect to the horizontal plane. However, as long as liquid, for example, water, can be drained, the mounting portion inclined surfaces may have an inclination angle less than 0.5 degrees, and the left-side top surface portion inclined surface and the right-side top surface portion inclined surface may have an inclination angle less than 3 degrees.

Further, this application claims priority from Japanese Patent Application No. 2016-040738, filed on Mar. 3, 2016, the entire disclosure of which is incorporated herein by reference.

REFERENCE SIGNS LIST 100, 100', 110" charging stand
100$df$, 100$df'$, 110$df''$ front end 100*dr*, 100*dr'*, 110*dr"* rear end
110A, 110B, 110C terminal placing section
120A, 120B, 120C charging terminal portion
121A, 121B, 121C charging terminal
122A, 122B, 122C housing
123A, 123B, 123C terminal portion top surface
124A, 124B, 124C guide projection portion
130A, 130B, 130C terminal mounting portion
131A, 131B, 131C mounting portion ridge line
132A, 132B, 132C mounting portion inclined surface
135A, 135B, 135C, 135D terminal protection portion
140 left-side top surface portion
141 left-side top surface portion ridge line
142 left-side top surface portion inclined surface
150 right-side top surface portion
151 right-side top surface portion ridge line
152 right-side top surface portion inclined surface
160A, 160B, 160C left-side guide portion
161A, 161B, 161C left-side guide portion base surface
162A, 162B, 162C left-side guide portion inclined surface
166A, 166B, 166C U-shaped wall portion
170A, 170B, 170C right-side guide portion
171A, 171B, 171C right-side guide portion base surface
172A, 172B, 172C right-side guide portion inclined surface
176A, 176B, 176C U-shaped wall portion
600 charging stand
610A, 610B terminal placing recessed section
621A, 621B charging terminal
700 portable terminal device
701 front panel
702 rear panel
703 display including touch panel
706 to-be-charged terminal
707 terminal-adjacent recessed portion
800 charging cable

The invention claimed is:

1. A charging stand, which has a stand width direction being a longitudinal direction of the charging stand and a stand depth direction perpendicular to the stand width direction, the charging stand comprising:
a terminal placing section, which is provided on an upper part of the charging stand so as to extend along the stand width direction, and onto which a portable terminal device is to be removably placed;
a terminal mounting portion, which is provided in the terminal placing section, and to which charging terminals are mounted, the charging terminals being configured to come into abutment with to-be-charged terminals of the portable terminal device placed on the terminal placing section, to thereby charge the portable terminal device;
a left-side top surface portion, which is provided on a left side of the terminal mounting portion in the stand width direction; and
a right-side top surface portion, which is provided on a right side of the terminal mounting portion in the stand width direction, the terminal mounting portion including:
a mounting portion ridge line, which extends along the stand depth direction; and
two mounting portion inclined surfaces, which extend while descending from the mounting portion ridge line to each of the left-side top surface portion and the right-side top surface portion, the left-side top surface portion including:
a left-side top surface portion ridge line, which extends along the stand width direction and at a height lower than a height of the mounting portion ridge line; and
two left-side top surface portion inclined surfaces, which extend while descending from the left-side top surface portion ridge line to each of a front end and a rear end of the charging stand in the stand depth direction, the right-side top surface portion including:
a right-side top surface portion ridge line, which extends along the stand width direction and at a height lower than the height of the mounting portion ridge line; and
two right-side top surface portion inclined surfaces, which extend while descending from the right-side top surface portion ridge line to each of the front end and the rear end of the charging stand in the stand depth direction.

2. A charging stand according to claim 1, wherein the mounting portion ridge line has a height equal to or lower than a height of a flat surface present in the terminal mounting portion.

3. A charging stand according to claim 1,
wherein the mounting portion ridge line passes through a center of the terminal mounting portion in the stand width direction, and
wherein the two mounting portion inclined surfaces have the same length in the stand width direction and the same inclination angle with respect to a horizontal plane.

4. A charging stand according to claim 1,
wherein the left-side top surface portion ridge line passes through a center of the charging stand in the stand depth direction,
wherein the two left-side top surface portion inclined surfaces have the same inclination angle with respect to a horizontal plane,
wherein the right-side top surface portion ridge line passes through the center of the charging stand in the stand depth direction, and
wherein the two right-side top surface portion inclined surfaces have the same inclination angle with respect to the horizontal plane.

5. A charging stand according to claim 1, further comprising:
a terminal protection portion, which is provided in a front and a rear of the terminal mounting portion in the stand depth direction so as to extend along the stand width direction and to protrude upward;
a left-side guide portion, which is provided on the left side of the left-side top surface portion in the stand width direction, and is configured to guide a left end portion of the portable terminal device to be placed onto the terminal placing section; and
a right-side guide portion, which is provided on the right side of the right-side top surface portion in the stand width direction, and is configured to guide a right end portion of the portable terminal device to be placed onto the terminal placing section, the left-side guide portion including:
a U-shaped wall portion, which protrudes upward so as to surround the left end portion of the portable terminal device placed on the terminal placing section; and
a left-side guide portion base surface, which has a height higher than the height of the left-side top surface portion ridge line inside the U-shaped wall portion, the right-side guide portion including:
a U-shaped wall portion, which protrudes upward so as to surround the right end portion of the portable terminal device placed on the terminal placing section; and a right-side guide portion base surface, which has a height higher than the height of the right-side top surface portion ridge line inside the U-shaped wall portion.

6. A charging stand according to claim 5,
wherein the left-side guide portion further includes a left-side guide portion inclined surface, which extends while descending from the left-side guide portion base surface to the left-side top surface portion, and
wherein the right-side guide portion further includes a right-side guide portion inclined surface, which extends while descending from the right-side guide portion base surface to the right-side top surface portion.

7. A charging stand according to claim 1, further comprising a plurality of terminal placing sections and a plurality of terminal mounting portions.

8. A charging stand according to claim 5, further comprising a plurality of terminal placing sections, a plurality of terminal mounting portions, a plurality of terminal protection portions, a plurality of left-side guide portions, and a plurality of right-side guide portions.

9. A charging stand according to claim 1, wherein the left-side top surface portion ridge line and the right-side top surface portion ridge line have the same height.

10. A charging stand according to claim 1,
wherein the two mounting portion inclined surfaces each have an inclination angle of 0.5 degrees or more with respect to a horizontal plane, and
wherein the two left-side top surface portion inclined surfaces and the two right-side top surface portion inclined surfaces each have an inclination angle of 3 degrees or more with respect to the horizontal plane.

* * * * *